United States Patent [19]

Westermark

[11] Patent Number: 4,799,941

[45] Date of Patent: Jan. 24, 1989

[54] METHOD AND ARRANGEMENT FOR CONDENSING FLUE GASES

[75] Inventor: Mats O. J. Westermark, Täby, Sweden

[73] Assignee: Scandiaconsult AB, Stockholm, Sweden

[21] Appl. No.: 111,760

[22] Filed: Oct. 23, 1987

[30] Foreign Application Priority Data

Oct. 23, 1986 [SE] Sweden ............................ 8604524

[51] Int. Cl.$^4$ ............................................ B01D 47/00
[52] U.S. Cl. ............................................. 55/90; 55/222;
261/146; 261/151; 261/153; 261/157;
261/DIG. 9; 110/215; 122/7 R
[58] Field of Search ............ 261/146, 151, 153, 157,
261/DIG. 9, 17; 55/80, 89, 90, 93, 222;
110/215; 122/7 R

[56] References Cited

FOREIGN PATENT DOCUMENTS

| 0122579 | 10/1984 | European Pat. Off. . | |
|---|---|---|---|
| 3145302 | 5/1983 | Fed. Rep. of Germany . | |
| 24320 | 2/1983 | Japan ........................ | 55/222 |
| 7158821 | 1/1981 | U.S.S.R. . | |

Primary Examiner—Bernard Nozick
Attorney, Agent, or Firm—Sughrue, Mion, Zinn, Macpeak & Seas

[57] ABSTRACT

The invention relates to a method for condensing flue gas in combustion plants, and an arrangement of apparatus herefor. In accordance with the invention the flue gas is cooled and humidified by bringing the gas into direct contact with water, whereafter the water vapor in the gas is cooled and condensed, the heat of condensation being recovered by indirect heat exchange. The heat of condensation is transferred partially to a heat absorbing medium, preferably return water in a district heating network, and partially to a circuit in which water is circulated within the plant, this water being used for heating and humidifying the combustion air.

10 Claims, 1 Drawing Sheet

METHOD AND ARRANGEMENT FOR CONDENSING FLUE GASES

TECHNICAL FIELD

The present invention relates to a method for condensing flue gases in combustion plants, and to an arrangement of apparatus for carrying out the method. The invention relates more specifically, although not exclusively, to the condensation of flue gases in the combustion of moist fuel and/or fuels rich in hydrogen, particularly in the combustion of solid fuels such as peat, woodchips and waste, for heating purposes, for instance in district heating systems.

BACKGROUND PRIOR ART

In conventional combustion plants a significant part of the energy content of the fuel is lost in the flue gases. This energy loss is reduced when the energy content is transferred to air, water, humidified air and the like, through condensation on the surfaces of heat exchangers. This technique is for instance applied for heating tap water.

In a steam boiler described in German Patent Specification No. 547 218, pre-heated air of combustion is humidified with heated pressurized water. The boiler waste gases also pre-heat air for combustion, boiler feed water and humidified air of combustion, in addition to pressurized water.

Swedish Patent Specification No. 163 470 describes a method and an arrangement of apparatus for heating humidified air and relatively cold air with the aid of the flue gases. The water used to humidify the air is optionally pre-heated, and the flue gases are then also used to this end.

SUMMARY OF THE INVENTION

TECHNICAL PROBLEM

The known flue gas cooling and flue gas condensing techniques do not enable the energy content of the flue gases to be utilized to the full. For example, in the case of district heating systems only a limited part of the heat content of the flue gases can be recovered through condensation, due to the high temperature of the recirculated water, or return water in the heating network, this water having a temperature of 50°–65° C.

SOLUTION

The invention solves this problem and improves the extent to which the energy content of moist flue gases can be recovered. Accordingly, the invention relates to a method for condensing flue gases in combustion plants, the method being characterized by the following combination of steps.

(a) cooling and humidifying the flue gas by spraying water thereinto;

(b) cooling and condensing water vapour from the flue gases in a first condensing stage, by indirect heat exchange with recirculated water, or return water, from a hot water circuit;

(c) further cooling and condensing water vapour from the flue gases in a second condensing stage, by indirect heat exchange with water from a combustion air humidifier;

(d) heating and humidifying combustion air in the humidifier by direct contact with heated recirculated water from the second condensing stage.

The invention also relates to an arrangement for carrying out the method, this arrangement comprising in combination a humidifier 8 for heating and humidifying combustion air, superheaters 10, 12 for superheating heated, humidified combustion air, a spray chamber 16 for cooling and humidifying the flue gases, an indirect heat exchanger 17 for heat transfer between water recirculated from a hot water circuit and flue gas, a heat exchanger 21 for indirect heat transfer between water from the humidifier and the flue gas, a liquid supply pipe 24 through which liquid is supplied for cleansing the droplet separator 23, a condensate collector 22 for collecting flue-gas condensate and spray and rinsing water, a supply pipe 1 for feeding additional water to the humidifier; a drainage pipe 5 for removing part of the water in the pipe 4 from the humidifier, and a pipe 28 for removing the condensate.

ADVANTAGES

The present invention enables a much higher percentage of the water vapour content of flue gases to be condensed than earlier known techniques, and thereby enables the combustion plant to be utilized to an economic maximum.

PREFERRED EMBODIMENT

Figure 1:
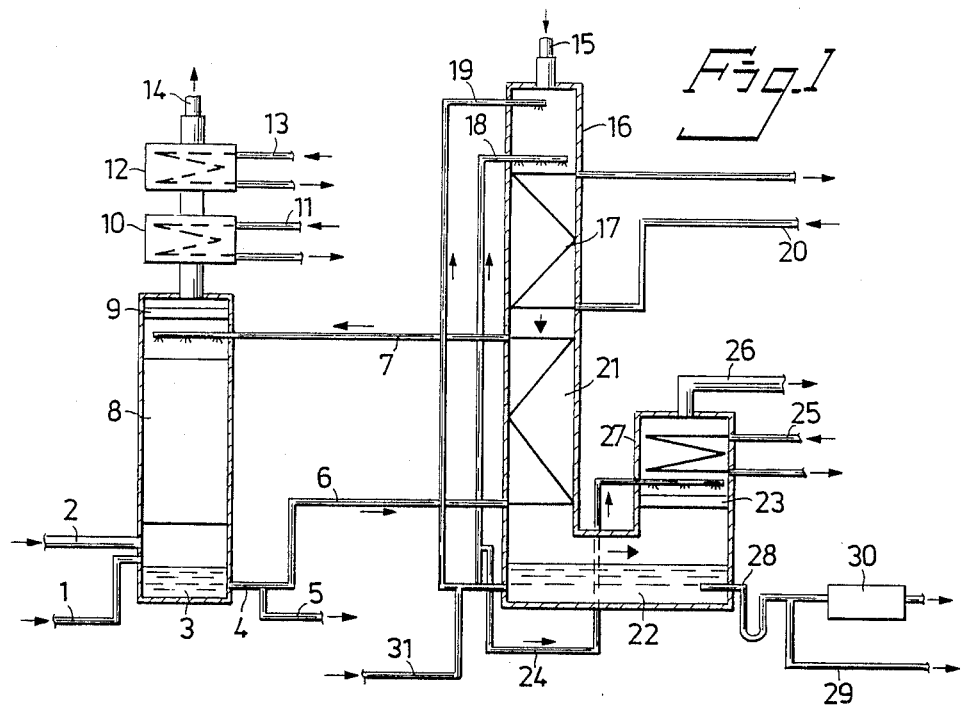
FIG. 1 illustrates a suitable arrangement of apparatus for carrying out the method according to the invention.

In accordance with the invention the flue gas is cooled and humidified, by bringing the gas into direct contact with water, and is then cooled such as to cause part of the water vapour present to condense. The heat of condensation is recovered by indirect heat exchange. This heat of condensation is transferred partly to a heat absorbing medium, preferably return water recirculated in a district heating network, and partly to a circuit in which water is circulated within the plant, this water being used to heat and humidify the combustion air.

According to one particularly suitable embodiment (see FIG. 1), air, so-called combustion air, entering the combustion plant through the pipe 2, is heated and humidified in a humidifier 8 in counter-flow with recirculated water arriving from the condenser stage 21, the humidifier 8 suitably being a humidification tower of the kind provided with tower packings or plates. Additional water for the humidification tower 8 is introduced through a pipe 1. The additional water conveniently comprises softened or de-ionized water, or a purified condensate.

In order to prevent impurities form concentrating in the humidification water, 5–50% of the water is continuously removed through a pipe 5, this quantity being calculated on the basis of the amount of additional water supplied to the humidification tower.

Arranged in the humidification tower is a droplet separator 9 which extracts droplets from the heated, humidified combustion air. Superheating of the heated, humidified combustion air deriving from the humidification tower is effected in superheaters 10, 12. The superheated combustion air is then passed to the combustion plant (not shown) through a pipe 14.

The flue gas deriving from the combustion plant is passed to a spray chamber 16 through a pipe 15, in which chamber the flue gas is humidified and cooled with spray water supplied through a pipe 19. The thus humidified and cooled flue gas is passed to a first condensing stage 17 for indirect heat exchange with return water taken from a heating network and supplied through a pipe 20. The flue gas is further cooled in this stage, such as to condense part of the water vapour contained in the gas, the heat of condensation released therewith being transferred to the return water, thereby heating the same. The flue gas is then passed to a second condensing stage 21, in which the gas is cooled still further and more water vapour is condensed by indirect heat exchange with water taken through a pipe 6 from a tank 3 located at the bottom of the humidification tower 8. In order to avoid the build-up of impurities on the heat exchanging surfaces of the condensing stage, these surfaces are cleansed intermittently with rinsing water supplied through pipe 18.

The flow of water in the humidification circuit - humidification tower 8 and pipes 4, 6 and 7—is preferably controlled so that the temperature difference between the return water arriving from the second condensing stage in the pipe 7 and the outgoing water in the pipe 4 reaches to 10°-30° C., preferably 15°-25° C. This enables a maximum of the waste heat contained by the flue gases to be recovered therefrom.

The cooled flue gas is passed to a droplet separator 23, and from there through a pipe 26 to a smoke stack or chimney. The separator 23 is cleansed intermittently with rinsing water supplied through pipe 24. When necessary, the flue gas, prior to being passed to the smoke stack, can be heated in a device 27 downstream of the separator 23, as illustrated in FIG. 1, so as to avoid corrosion in the smoke stack and in the flue ducts or channels upstream of the smoke stack.

The spray water, rinsing water, flue-gas condensate and the droplets extracted in the droplet separator 23 are collected in a condensate collector 22, from which the liquid present therein can be tapped-off and passed through a pipe 28 to cleaning apparatus 30, or through a pipe 29 to a recipient. cleansing chemicals of different kinds can be supplied to the condensing stages so as to improve cleansing of the gas, preferably through a pipe 31 connected to the pipe 19 through which the spray water is conducted.

According to one particularly suitable embodiment of the invention (not shown) the additional water used in the humidification tower is condensate taken from the second condensing stage. In this case there is preferably arranged between the first and the second condensing stages a collecting plate for the dirty condensate obtained in this stage, in combination with suitable pipes or lines which enable "contaminated" condensate from the first condensing stage to be separated form the "purer" condensate from the second condensing stage.

The invention is further illustrated in the following working example, which is described with reference to FIGS. 1 and 2.

EXAMPLE

The example relates to a combustion plant for burning peat having a moisture content of 50%, in order to heat water in a district heating network, the recirculated water, or return water, having a temperature of 60° C.

Combustion air heated to 20° C. was passed through the pipe 2 to the humidification tower 8 at a rate of 3.9 kg/s. Softened water having a temperature of 10° C. was passed through the pipe 1 to the tank 3 at the bottom of the humidification tower 8 at a rate of 0.63 kg/s.

15.59 kg of water heated to a temperature of 38° C. were taken each second from the tank 3 at the bottom of the humidification tower 8, through the pipe 4. 0.19 kg of this water was passed each second through the pipe 5 to waste, said water having a temperature of 38° C. The remainder of the water, having a temperature of 38° C., was passed through the pipe 6 to the second condensing stage 21 at a flow rate of 15.4 kg/s. The water was heated in the condensing stage to a temperature of 58° C., by indirect heat exchange with the flue gas.

The droplet separator 9 extracted water droplets from the combustion air within the humidification tower. Hot, humidified combustion air, having a temperature of 56° C. and a dew point of 56°0 C., was passed from the humidification tower 8 to the first superheater 10 at a rate of 4.34 kg/s, for indirect heat exchange with hot water having a temperature of 180° C. and supplied to the pipe 11 from the hot water circuit (not shown) of the combustion plant. The humidified combustion air was herewith heated to 95° C. and was then superheated in a second superheater 12 to 190° C. The second superheater was heated with flue gas taken from the boiler of the combustion plant through the pipe 13 at a rate of 5.2 kg/s, said flue gas having a temperature of 245° C. The temperature of the flue gas fell therewith to 170° C. The flue gas, which had a water dew point of 72° C., was then passed to the spray chamber 16 through the pipe 15. The superheated, humidified combustion air was then fed to the boiler (not shown) through the pipe 14. The flue gas was cooled and humidified with the aid of the spray water supplied through the line 19. The flue gas was condensed in the first condensing stage 17 by indirect heat exchange with the return water recirculated from the district heating network and supplied through the pipe 20, the return water being heated from 60° C. to 65.4° C. The return water had a rate of flow of 70.5 kg/s. The dew-wet flue gas was fed from the condensing stage 17 to the second condensing stage 21 at a rate of 4.81 kg/s and at a temperature of 65° C. The flue gas left the second condensing stage at a rate of 4.32 kg/s and a temperature of 48° C., and was dew-wet.

The flue gas was then passed through the condensate collector 22 and the droplet separator 23, and was then passed through the device 27 in which its was heated to 58° C. The device 27 was indirectly heated with steam supplied through the pipe 25 having a temperature of 180° C. with a steam flow rate of 0.022 kg/s. The stem was taken from the steam dome (not shown) of the combustion plant.

The condensate obtained in condensing stages 17, 21, the spray and rinsing water from the spray chamber 16, the rinsing water and extracted droplets from the droplet separator 23 were collected in the condensate collector 22.

Condensate was removed from the condensate collector 22 through the pipe 28 at a rate of 0.88 kg/s and at a temperature of 47°0 C., this condensate being passed to a district sewage plant through the pipe 29.

A power output of 8.9 MW as obtained from the combustion plant. When flue gas was cooled to 65° C. in a conventional manner, by heat exchange with return water from the district heating network but without humidifying the combustion air in accordance with the invention, there was obtained a power output of 7.6

MW, i.e. a decrease of 14.6% compared with flue-gas condensing in accordance with the invention. In a conventional combustion plant in which the flue gases were not condensed, the corresponding power output was only 7.3 MW, i.e. 18% lower than the power output obtained by means of the invention.

Figure 2:
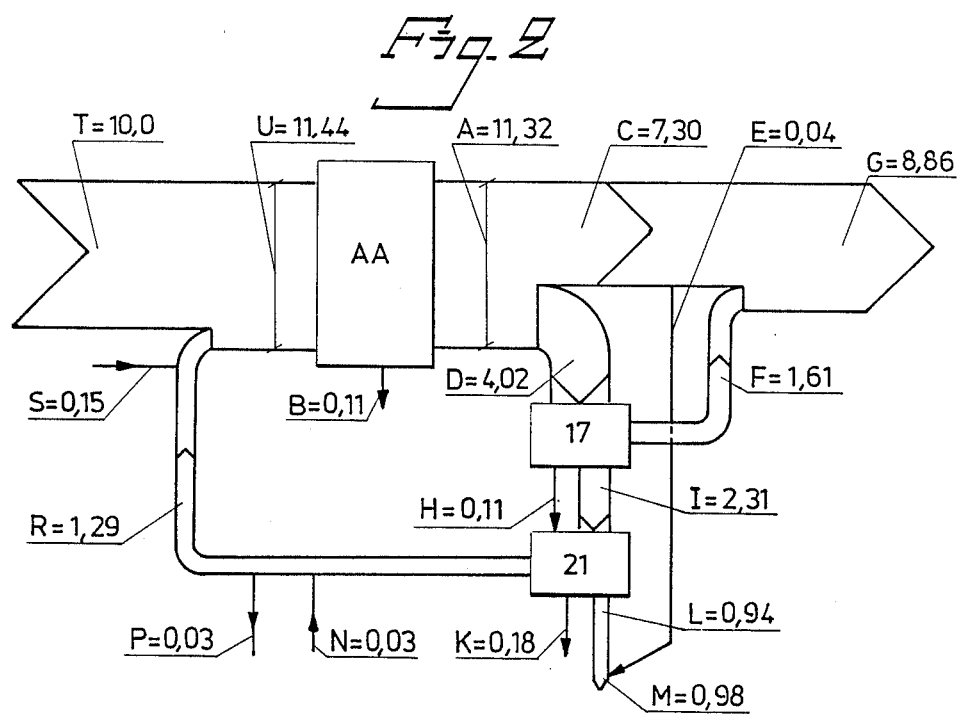
FIG. 2 is an energy flow diagram illustrating one embodiment of the invention.

The energy flow in the example is illustrated in FIG. 2. The significance of the various references will be seen from the following table.

AA = Heating boiler
17 = Condensing stage 1
21 = Condensing stage 2
A = From heating boiler, MW
B = Combustion losses, MW
C = Return water from the district heating network heated in the heating boiler, MW
D 32 Flue gas from the heating boiler, MW
E = Superheating, MW
F = Return water from the district heating network heated in the first condensing stage, MW
G = From the combustion plant, MW
H = Condensate, MW
I = Flue gas from the first condensing stage, MW
K = Condensate from the second condensing stage, MW
L = Flue gas from the second condensing stage, MW
M = Heated flue gas to the flue stack, MW
N = Additional water, MW
P = Removed humidification water, MW
R = Heated humidification, water, MW
S = Supplied combustion air, MW
T = Fuel supply, MW
U = To the heat boiler, MW The flow R, i.e. the flow from the second condensing stage 21 to the heating boiler AA, is not found in a conventional flue-gas condensing plant in which the combustion air is not humidified.

I claim:

1. A method for condensing flue gas in combustion plants, comprising the following combination of steps,
   (a) cooling and humidifying flue gas by injecting water thereinto,
   (b) cooling and condensing water vapour from the flue gas in a first condensing stage, by indirect heat exchange with return water from a hot water circuit,
   (c) further cooling and condensing water vapour from the flue gas in a second condensing stage, by indirect heat exchange with water from a combustion air humidifier,
   (d) heating and humidifying combustion air in the humidifier by direct contact with heated return water from the second condensing stage.

2. A method according to claim 1, wherein the additional water supply to the humidifier comprises condensate taken from the second condensing stage.

3. A method according to claim 1, wherein the method includes superheating the combustion air subsequent to humidifying the same.

4. A method according to claim 1 or 3, wherein the method includes extracting droplets from the flue gas and reheating said gas upon completion of the gas cooling process.

5. A method according to claim 1, wherein the method includes supplying water to the humidifier and tapping therefrom 5–50% of the volume of water supplied thereto.

6. A method according to claim 5, wherein the additional water supplied to the humidifier comprises softened and/or de-ionized water, or cleansed condensate from the flue-gas condensing process.

7. A method according to claim 1, wherein the method includes controlling the flow of water to the humidifier in a manner such that the temperature difference between the in-going and out-going water is 10°–30° C.

8. A method according claim 7, wherein said temperature difference is 15°–25° C.

9. An arrangement for carrying out a method for condensing flue gas comprising in combination a moistener for heating and humidifying combustion air, superheaters for superheating heated, humidified combustion air, a spray chamber for cooling and humidifying flue as, an indirect heat exchanger for heat exchange between return water from a hot water circuit and flue gas, an indirect heat exchanger for heat transfer between water from the humidifier and flue gas, a condensate collector for collecting flue-gas condensate and spray water and rinsing water, a supply pipe for additional water to the humidifier, a pipe for removing part of the water from the humidifier, and a pipe for removing condensate.

10. An arrangement according to claim 9, wherein the method includes a supply pipe for supplying gas cleansing chemicals to the spray chamber through the pipe.

* * * * *